Nov. 17, 1970 C. F. AULT ET AL 3,541,573
SELECTIVE INFORMATION RECORDING AND ERASING CIRCUIT
Filed June 7, 1968 2 Sheets-Sheet 1

INVENTORS C. F. AULT
R. J. REDNER
BY
D. F. Snedeker
ATTORNEY

United States Patent Office 3,541,573
Patented Nov. 17, 1970

3,541,573

SELECTIVE INFORMATION RECORDING AND ERASING CIRCUIT

Cyrus F. Ault, Wheaton, and Richard J. Redner, Glen Ellyn, Ill., assignors to Bell Telephone Laboratories, Incorporated, Murray Hill and Berkeley Heights, N.J., a corporation of New York Filed June 7, 1968, Ser. No. 735,217
Int. Cl. G11b *5/02*
U.S. Cl. 346—74 9 Claims

ABSTRACT OF THE DISCLOSURE

An alternating current is generated in a record head winding for selectively magnetizing or demagnetizing individual bit magnets on twistor magnet memory cards by alternately connecting opposite ends of the winding to an initially charged capacitor and then to ground over first and second resonant paths. The magnitude of the current decays as the capacitor discharges, thereby producing a demagnetizing waveform. The magnetizing waveform is produced by terminating the current after several cycles, the last half-cycle of current determining the polarity of magnetization.

BACKGROUND OF THE INVENTION

This invention relates to information storage systems and more particularly to magnetic recording circuits for selectively magnetizing and demagnetizing discrete portions of a magnetic storage medium.

Various circuit arrangements utilizing magnetic storage mediums have found widespread application, particularly in the information handling and data processing art. Magnetic storage mediums are capable of storing large quantities of information in discrete surface portions often referred to as storage cells, each cell storing a unit of information such as a binary bit. For example, a bit of information of one binary character may be represented by a storage cell in a magnetized condition, and a bit of information of the other binary character may be represented by a storage cell in a nonmagnetized condition. Information is stored on the magnetic medium, therefore, by selectively magnetizing the storage cells in accordance with the binary bits of information to be stored therein.

If the surface of the magnetic medium is initially in a nonmagnetized condition, storage of information is readily effected through the selective energization of a magnetizing, or record, transducer moving adjacent a channel or column of storage cells. Energization of the transducer places the adjacent storage cell in a magnetized condition to store a bit of information of the one binary character. Similarly, if the surface of the magnetic medium is initially in a magnetized condition, information storage is readily effected by selectively energizing a demagnetizing, or erase, transducer moving adjacent a channel of storage cells. However, where the surface of the medium comprises both magnetized and nonmagnetized storage cells, the storage of information is less readily effected. This condition may occur, for example, where a pattern of information is already stored on the medium and it is desired to change all or part of the prior information. In those instances where it is desired to replace only a small part of the prior information with new information, it is usually not practicable to first bulk treat the entire surface of the magnetic medium to place it in a magnetized or nonmagnetized condition. Rather, it is desirable to erase and record information only in those storage cells in which the prior information is to be replaced. Further, it is desirable to erase and to record information in the various storage cells during a single pass thereof.

This is partially accomplished in known information storage arrangements by providing separate erasing and recording circuitry, an erase transducer moving adjacent a channel of storage cells ahead of a record transducer. As the erase transducer passes adjacent a storage cell in which new information is to be stored, it is energized to erase the prior information stored therein. Thereafter the record transducer passes adjacent the same storage cell and is controlled to effect the storage of new information therein. The use of separate recording and erasing circuitry, however, undesirably increases the cost, circuit complexity and bulk of the information storage arrangement, and limits the overall speed of the information recording operation.

Further, known information recording circuitry of the type disclosed in C. F. Ault-D. Friedman Pat. 3,274,610, issued Sept. 20, 1966, using the same circuitry for selectively magnetizing and demagnetizing discrete portions of a magnetic storage medium, though generally satisfactory, has been found to be somewhat expensive and disadvantageously dependent on the Q of the record transducer, the latter necessitating the use of a relatively narrow transducer translating gap.

Accordingly, it is a general object of this invention to provide a simple, compact and economical information recording circuit.

More particularly, it is an object of this invention to provide a simple, compact and economical information recording circuit for selectively magnetizing and for selectively demagnetizing discrete portions of a magnetic storage medium.

It is a further object of this invention to provide a circuit for erasing magnetically recorded information from discrete portions of a storage medium, which circuit may also be employed advantageously to magnetically record information on discrete portions of the storage medium.

The storage cells of a magnetic medium are usually arranged in a plurality of parallel channels or columns. When a magnetizing field is applied to a storage cell in one channel, a portion thereof may infringe upon storage cells in immediately adjacent channels. If a similar magetizing field is applied to these adjacent storage cells, no problem arises. When, however, a demagnetizing field is concurrently applied to an adjacent storage cell the interaction of the two field tends to degrade the magnetization of the one storage cell. Further, the interaction of the two fields tends to an even greater extent to degrade the demagnetization of the adjacent storage cell, thus leaving it with a residual level of magnetization. Accurate readout of the stored information can be readily accomplished only when sufficient margin is maintained between the level of magnetization of the magnetized and the nonmagnetized storage cells.

The importance of maintaining sufficient magnetization level margins between magnetized and nonmagnetized storage cells, and more particularly the importance of demagnetizing a nonmagnetized storage cell to a very low level of residual magnetization, increases considerably in information storage systems of the permanent magnet, card changeable type such as disclosed, for example, in an article entitled "A Card-Changeable Permanent-Magnet-Twistor Memory of Large Capacity" published in the I.R.E. Transactions on Electronic Computers, vol. EC–10, pp. 451–461, September 1961. Therein, information is stored through the use of removable cards having a plurality of small bar magnets bonded or deposited thereon. The cards are situated in the memory such that each bar magnet is in the proximity of a respective magnet crosspoint element. If a bar magnet is in a magnetized condition the respective memory crosspoint element is thus biased by the static magnetic field of the magnet. When an interrogation signal is applied to a memory crosspoint in the absence of a static magnetic field, an output signal is generated representative of a bit of one binary character. The presence of a static magnetic field due to a bar magnet, however, inhibits generation of an output signal from a crosspoint, which is representative of a bit of the other binary character.

Clearly, therefore, the level of magnetization of a magnet in a magnetized condition and the level of magnetization of a magnet in a nonmagnetized condition must be sufficiently distinct from one another to permit accurate discrimination during interrogation. Moreover, it is desirable that the residual magnetization level of a magnet in a nonmagnetized condition be as low as possible to preclude there being sufficient static magnetic field therefrom to erroneously inhibit the generation of an output signal during interrogation.

SUMMARY OF THE INVENTION

It is accordingly a further object of this invention to provide circuitry for demagnetizing a storage cell on a magnetic medium and for concurrently magnetizing an immediately adjacent storage cell, which circuitry minimizes the interaction effects of adjacent magnetizing and demagnetizing fields.

A still further object of this invention is to provide a circuit for selectively demagnetizing individual storage cells of a magnetic medium to a substantial low level of residual magnetization during continuous relative movement between a transducer and the magnetic medium.

Another object of this invention is to provide recording circuitry advantageously suited for selectively magnetizing and demagnetizing discrete storage cells of the bar magnet type.

It is a more specific object of this invention to provide circuitry for selectively magnetizing or demagnetizing discrete bar magnets during continuous relative movement between a transducer and the magnets.

Yet another object of this invention is to provide recording circuitry for selectively magnetizing or demagnetizing discrete magnetic cells, which circuitry is operative independently of the Q of the record transducer.

In accordance with a specific embodiment of our invention, the above and other objects are attained through circuitry employing an electromagnetic transducer having a single winding energized by a common record-erase circuit selectively for recording information on a magnetic medium or for erasing information previously recorded on the magnetic medium. The terminals of the transducer winding are alternately connected via a switching circuit to an initially charged first capacitor and then to ground over resonant paths including respective capacitors to produce an alternating current in the transducer winding. Both recording and erasing operations are similarly initiated by connecting the transducer winding terminals alternately and successively to the charged first capacitor and then to ground at the approximate frequency of the respective resonant paths, causing alternating current to flow in the transducer winding. The magnitude of the alternating current is initially at, or greater than, a first level sufficient to magnetically control the switching of a storage cell adjacent the transducer.

If the storage cell is to be demagnetized, alternate connection of the two transducer winding terminals to the charged first capacitor continues at the resonant path frequency and, as the first capacitor discharges, the magnitude of the alternating current in the transducer winding is decreased to a second level sufficient to maintain magnetic control of the storage cell. The current in the winding is maintained at this second level until the transducer is no longer adjacent the storage cell, thereby minimizing the level of any residual magnetization left on the storage cell. Thereafter the alternate connection of the transducer winding terminals to the first capacitor is discontinued and the first capacitor is recharged before the transducer is placed adjacent a successive storage cell.

If a storage cell adjacent the transducer is to be magnetized, circuit operation is the same as above for the first several cycles of the alternating current in the transducer winding at the first level. At this point the switching operation is discontinued, the last half cycle of the current in the transducer winding saturating the storage cell situated adjacent the transducer. The polarity of saturation corresponds to the polarity of the last half cycle of current in the transducer winding and is thus determined selectively by the particular point at which switching operation is terminated.

The effects of interaction between a magnetizing field being applied to one storage cell and a demagnetizing field being applied to an adjacent storage cell are therefore advantageously minimized through the use of circuitry in accordance with the principles of our invention. Both magnetizing and demagnetizing fields are initially at the same first level of intensity at substantially the same time. Thereafter the magnetizing field decreases rapidly to a level which is sufficiently low to minimize interaction with the demagnetizing of adjacent storage cells. From that point until the transducers pass from the proximity of their respective storage cells no current flows in the windings of those transducers adjacent magnetized storage cells, while those transducers adjacent storage cells being demagnetized continue to be driven by alternating current at a decreased second level.

BRIEF DESCRIPTION OF THE DRAWING

The above and other objects and features of the present invention may be better understood upon consideration of the following detailed description and the accompanying drawing in which.

DETAILED DESCRIPTION

Figure 1:
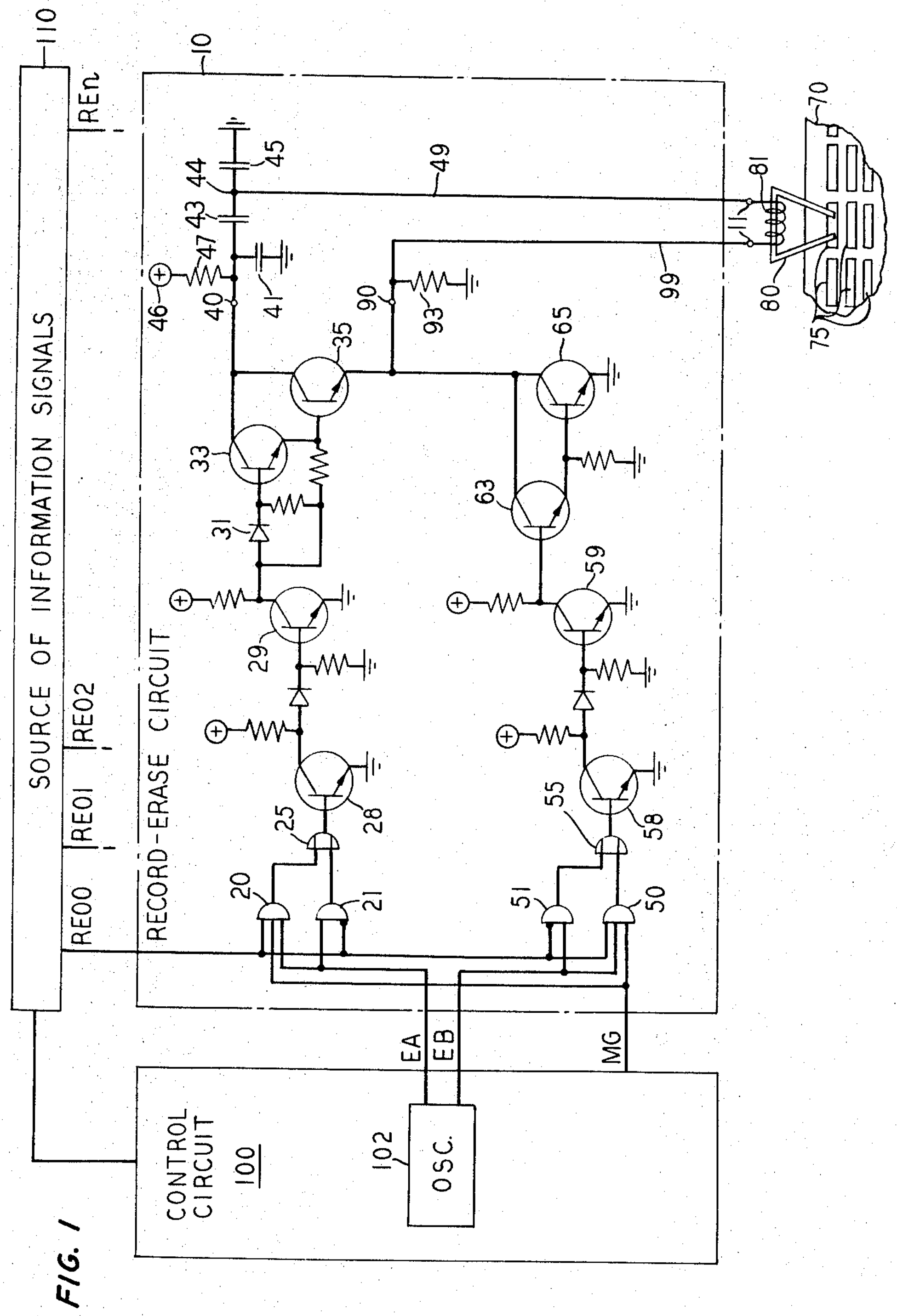
FIG. 1 is an illustrative embodiment of an information recording circuit in accordance with the principles of our invention.

In FIG. 1 of the drawing a magnetic storage medium 70 is shown comprising a plurality of discrete magnetic storage cells 75, each storage cell 75 being capable of storing a unit of information such as a binary bit. For the purposes of description, it will be assumed that a storage cell 75 is magnetized to store a bit of one binary character and that a storage cell 75 is demagnetized to store a bit of the other binary character. Relative motion is imparted between storage medium 70 and transducer 80 situated adjacent thereto, and a storage cell 75 passing adjacent transducer 80 is magnetized or demagnetized in accordance with the signal applied to energization winding 81 of transducer 80. Although only one transducer 80 is shown in FIG. 1, for purposes of clarity, it will be apparent that a plurality of such transducers may be employed for parallel information storage, each transducer being situated adjacent a respective channel or column of storage cells 75.

The terminals of winding 81 of each transducer 80 are connected to respective output terminals 11 of an individual record-erase circuit 10. Input signals are provided to record-erase circuit 10 on leads EA, EB and MG from control circuit 100 and on lead RE00 from source of information signals 110. Source of information signals 110 may include any source presenting information signals to be recorded in storage cells 75 and may provide such signals in parallel on leads RE00 and RE01 through RE*n* for parallel recordation in a row of storage cells 75. Control circuit 100 comprises an oscillator 102 for providing successive signals at a predetermined frequency alternately on leads EA and EB to record-erase circuit 10. Control circuit 100 further comprises circuitry for providing record signals on lead MG, as described below, which circuitry may be similar to the type shown, for example, in C. F. Ault-D. Friedman-R. H. Grainger-J. J. Madden Pat. No. 3,281,807, issued Oct 25, 1966.

Record-erase circuit 10 in accordance with the principles of our invention is shown comprising a first capacitor 41 connected between terminal 40 and ground, and a source 46 for initially charging capacitor 41 to a reference potential through resistor 47. One terminal 11 of winding 81 is connected over lead 49 to ground through capacitor 45 and to terminal 40 through capacitor 43. The other terminal 11 of winding 81 is connected over lead 99 to terminal 90 and to ground through resistor 93.

Leads EA and MG from control circuit 100 and lead RE00 from source of information signals 110 are connected to the inputs of AND gate 20, the output of which is connected to an input of OR gate 25. Lead EA is also connected to an input of AND gate 21, and lead RE00 is connected to an inverter input of AND gate 21, the output of which is connected to another input of OR gate 25. Leads MG and RE00, along with lead EB are also connected to the inputs of AND gate 50, the output of which is connected to an input of OR gate 55. Lead EB is further connected to an input of AND gate 51, and lead RE00 is connected to an inverter input of AND gate 51, the output of which is connected to another input of OR gate 55. OR gates 25 and 55 are connected through individual amplifier circuits and individual switching circuits to terminals 40 and 90, respectively. Thus, the output of OR gate 25 is connected to an amplifier circuit comprising transistors 28 and 29, the collector of transistor 29 being connected to a switching circuit comprising transistors 33 and 35 connected between terminal 40 and terminal 90. Similarly, the output of OR gate 55 is connected to an amplifier circuit comprising transistors 58 and 59. The collector of transistor 59 is connected to a switching circuit comprising transistors 63 and 65 connected between terminal 90 and ground.

Figure 2:
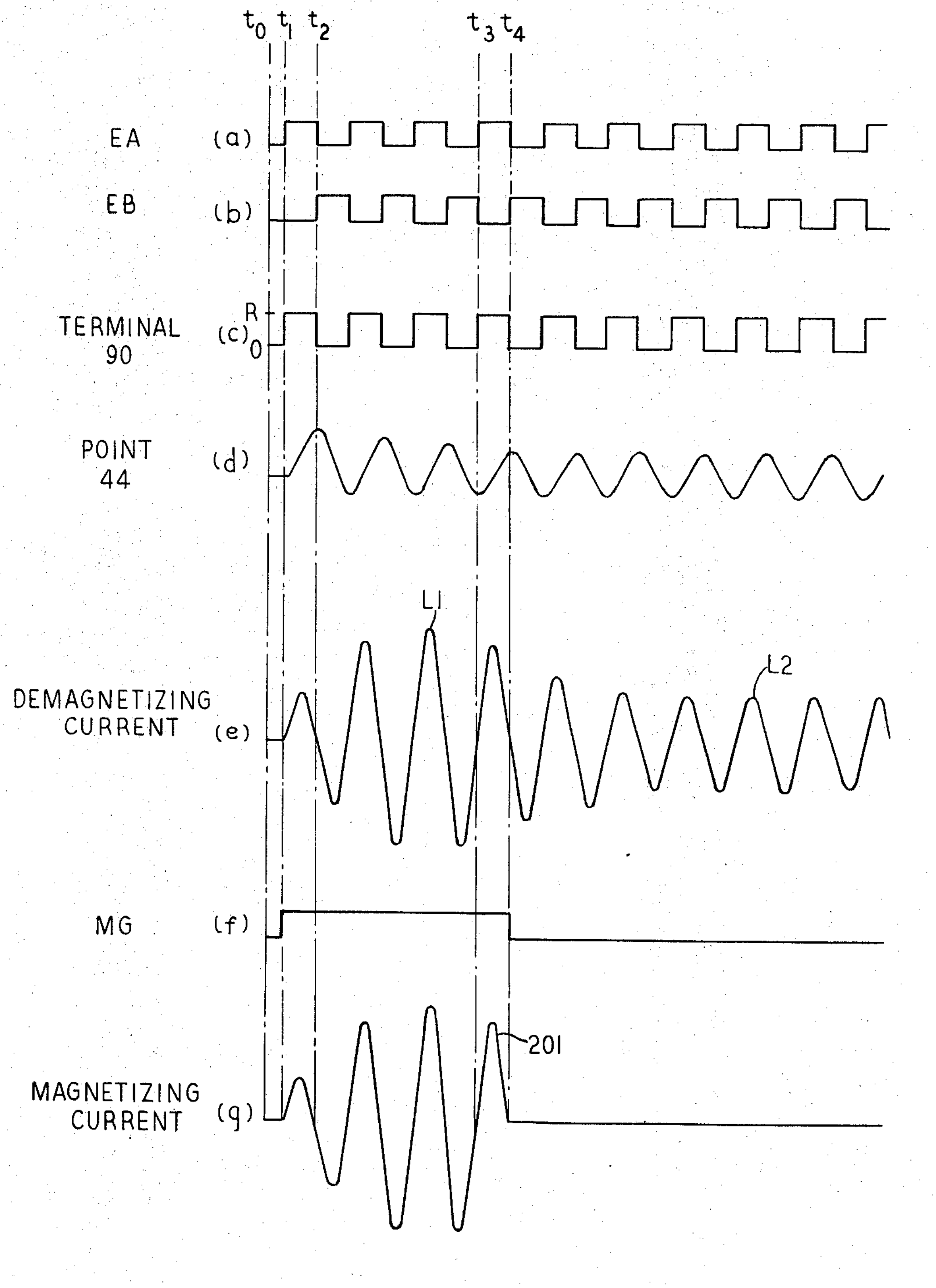
FIG. 2 is a time chart indicating the operation of the illustrative embodiment of FIG. 1.

For information storage purposes, as mentioned above, relative motion is imparted between transducer 80 and storage medium 70. During the time transducer 80 is adjacent a storage cell 75 of storage medium 70, information is stored therein in accordance with the signal provided to winding 81 of transducer 80. For example, let it be assumed that transducer 80 is adjacent a storage cell 75 which it is desired to place in a nonmagnetized condition, as indicated by the presence of a binary "0" on lead RE00. Oscillator 102 is energized by control circuit 100 to provide a train of successive positive pulses alternately on leads EA and EB to record-erase circuit 10, which pulses may comprise a 12.5 kHz. square wave on lead EA and its complement on lead EB, by way of example, as illustrated in FIGS. 2($a$) and 2($b$). The pulses on leads EA and EB are applied to record-erase circuit 10 by oscillator 102 during the time transducer 80 and the particular storage cell 75 being demagnetized are adjacent each other, illustratively on the order of five milliseconds.

The pulses on lead EA are directed through AND gate 21, enabled by the binary "0" on lead RE00, and through OR gate 25 to the base of transistor 28 which is normally in a high impedance, nonconducting state. During each of the pulses on lead EA transistor 28 is switched to a low impedance, conducting state to drive transistor 29. Transistor 29, in turn, drives switching circuit transistors 33 and 35 which function as a normally open switch connected between terminals 40 and 90. Transistors 33 and 35 are rendered conducting, and the switch thus closed, during each pulse on lead EA, thereby connecting terminal 90 to terminal 40. Similarly, transistors 63 and 65 function as a normally open switch connected between terminal 90 and ground which is closed during each pulse on lead EB, thereby connecting terminal 90 to ground. The pulses appearing alternately on leads EA and EB, therefore, connect terminal 90 alternately to a reference potential at terminal 40 and to ground potential.

Initially, before a pulse appears on either of leads EA and EB, capacitor 41 is charged through resistor 47 to a reference potential R determined by source 46, and capacitors 43 and 45 are discharged through resistor 93. Resistor 93 is assumed to be of a relatively high impedance such that it has no significant effect during the switching operation. At time $t_0$, therefore, the reference potential R appears at terminal 40. Ground potential appears at terminal 90 and at point 44 at time $t_0$, as illustrated in FIGS. 2($c$) and 2($d$), respectively. Assume now that the first pulse from oscillator 102 appears on lead EA as shown at time $t_1$ in FIG. 2($a$). Transistors 33 and 35 are switched to a low impedance conducting state, connecting terminal 90 to the reference potential R at terminal 40, as illustrated in FIG. 2($c$). Current flows through transducer winding 81 over a first path traced from source 46 and capacitor 41 via terminal 40 through transistors 33 and 35, terminal 90 over lead 99, through winding 81 over lead 49, through capacitor 45 to ground. Capacitor 45 is charged thereby.

Upon cessation of the pulse on lead EA transistors 28, 29, 33 and 35 return to their high impedance states, disconnecting terminal 90 from terminal 40. At the same time, time $t_2$ in FIG. 2, a pulse appears on lead EB switching transistors 63 and 65 to a low impedance state, connecting terminal 90 therethrough to ground. Terminal 90 thus falls in potential from reference potential R to ground as indicated in FIG. 2($c$). Current now flows in winding 81 over a second path traced from source 46 and capacitor 41 through the capacitor 43, point 44, lead 49, winding 81, lead 99, terminal 90, transistors 63 and 65 to ground. Capacitor 43 charges and capacitor 45 discharges via the above-traced path from point 44 to ground.

The alternate connection of terminal 90 between the reference potential at terminal 40 and ground continues under control of the pulses appearing on lead EA and EB at substantially the resonant frequency of the above-traced first and second paths including capacitors 43 and 45, respectively. The potential at point 44, intermediate capacitors 43 and 45, thus alternates at the frequency of the pulses on leads EA and EB and is ninety degrees displaced from the pulses on lead EA, as shown in FIG. 2($d$). The alternating current produced in winding 81 increases initially to a first level L1 which is chosen to be sufficiently large to assure that the transducer 80 has gained control of the magnetic switching of the storage cell 75 adjacent thereto. Thereafter the magnitude of the alternating current flowing in winding 81 decreases, as capacitor 41 discharges, to a second level L2 determined principally by source 46 and resistor 47. This second level of alternating current is sufficient to permit transducer 80 to maintain control of the storage cell until it is no longer adjacent thereto. This minimizes the effect on the storage cell of any nearby magnetizing fields. A graphical representation of the demagnetizing current thus generated in winding 81 of transducer 80 is illustrated in FIG. 2($e$).

Upon transducer 80 passing from the proximity of the storage cell being demagnetized, control circuit 100 deenergizes oscillator 102, resulting in cessation of the pulses on leads EA and EB. Transistors 33, 35, 63, and 65 are thus returned to their normal nonconducting state, capacitor 41 recharges to the reference potential provided by source 46, and capacitors 43 and 45 discharge through resistor 93 before transducer 80 passes adjacent a successive storage cell 75.

Now let it be assumed that transducer 80 is adjacent a storage 75 which it is desired to place in a magnetized condition, as indicated by a binary "1" on lead RE00 from source of information signals 110. A signal also appears on lead MG from control circuit 100 to control the duration and the desired polarity of magnetization to be applied to storage cell 75. For purposes of illustration, assume that it is desired to magnetize the storage cell in a positive polarity direction. The signal on lead RE00 and the signal on lead MG are each applied to inputs of AND gates 20 and 50, the remaining inputs of which are connected to leads EA and EB, respectively.

Initially, then, oscillator 102 is energized in the same manner as for demagnetization of a storage cell, providing pulses alternately on leads EA and EB to record-erase circuit 10. The pulses appearing on leads EA and EB, therefore, are extended alternately through OR gates 25 and 55, connecting terminal 90 to terminal 40 and to ground, respectively. The potential at terminal 90 and at point 44 thus varies for the first several cycles in the manner shown in FIGS. 2(*c*) and 2(*d*), the alternating current through transducer winding 81 increasing initially in magnitude to level L1 sufficiently to gain control of the adjacent storage cell 75. At time $t_4$ a pulse appears on lead EB, the normal function of which is to connect terminal 90 to ground. However, coincident with the pulse on lead EB at time $t_4$, control circuit 100 terminates the signal on lead MG to disable AND gates 20 and 50, as illustrated in FIG. 2(*f*), Consequently, the alternating current in winding 81 terminates at time $t_4$ as shown in the graphical representation of the magnetizing current illustrated in FIG. 2(*g*). The magnetic field thus generated by transducer 80 saturates adjacent storage cell 75, the last half-cycle 201 of the current in winding 81 placing storage cell 75 in the desired magnetized condition. Since the large magnetizing current level ceases well before the demagnetizing current being applied to other adjacent transducers, as illustrated in FIGS. 2(*e*) and 2(*g*), degradation of the demagnetized condition of storage cells adjacent the other transducers is minimized.

In the above description it was assumed that the signal on lead MG was terminated at time $t_4$ by control circuit 100. Clearly, if the opposite polarity of magnetization is desired, the signal on lead MG is terminated by control circuit 100 at a time to disable AND gates 20 and 50 upon completion of a negative half-cycle of the current in winding 81, such as at time $t_3$ in FIG. 2.

It is to be understood that the above-described arrangements are merely illustrative of the application of the principles of our invention. Numerous other arrangements may be devised by those skilled in the art without departing from the spirit and scope of this invention.

What is claimed is:

1. A magnetic recording circuit for selectively magnetizing and demagnetizing discrete portions of a magnetic storage medium comprising, a transducer having a single winding, a first capacitor, first and second capacitive circuit paths, means for initially charging said first capacitor, means for alternately connecting said first capacitor in circuit with said transducer winding over said first and second capacitive circuit paths, respectively, to generate an alternating current in said winding, and means selectively operable for terminating said current in said winding prior to the discharge of said first capacitor.

2. A magnetic recording circuit in accordance with claim 1 wherein said initial charging means comprises a source of potential connected to a first terminal, and wherein said first capacitor is connected between said first terminal and ground potential.

3. A magnetic recording circuit in accordance with claim 2 wherein said transducer winding has first and second terminals, wherein said first capacitive circuit path connects said first winding terminal to said first terminal connected to said first capacitor and said source, and wherein said second capacitive path connects said first winding terminal to ground potential.

4. A magnetic recording circuit in accordance with claim 3 wherein said alternate connecting means comprises switching means for connecting said second winding terminal alternately to ground potential and to said first terminal connected to said first capacitor and said source.

5. A magnetic recording circuit in accordance with claim 4 wherein said current terminating means comprises means for terminating the alternate connecting operation of said switching means.

6. A magnetic recording circuit in accordance with claim 5 further comprising means operative upon termination of said alternate connecting operation of said switching means for discharging energy from said first and second capacitive circuit paths.

7. A magnetic recording circuit in accordance with claim 1 wherein said first and second capacitive circuit paths, in conjunction with said transducer winding, comprise first and second resonant paths and wherein said alternate connecting means operates at a frequency substantially equal to the natural frequency of said first and second resonant paths.

8. A magnetic recording circuit in accordance with claim 7 wherein said first capacitive circuit path includes a capacitor connecting one terminal of said transducer winding to ground potential, and wherein said second capacitive circuit path includes another capacitor connecting said one terminal of said winding to said first capacitor.

9. A magnetic recording circuit in accordance with claim 8 wherein said alternate connecting means comprises first switching means connected between said first capacitor and the other terminal of said transducer winding, second switching means connected between said other terminal and ground potential, and means for alternately operating said first and second switching means.

References Cited

UNITED STATES PATENTS

| | | | |
|---|---|---|---|
| 3,126,547 | 3/1964 | Rosenberg -------- | 340—174.1 |
| 3,274,610 | 9/1966 | Ault et al. --------- | 340—174.1 |

BERNARD KONICK, Primary Examiner

W. F. WHITE, Assistant Examiner

U.S. Cl. X.R.

179—100.2; 340—174.1